US012670605B2

(12) United States Patent
Zhang et al.

(10) Patent No.: US 12,670,605 B2
(45) Date of Patent: Jun. 30, 2026

(54) IMAGE PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Honglun Zhang, Shenzhen (CN); Xintao Wang, Shenzhen (CN); Yu Li, Shenzhen (CN); Yanze Wu, Shenzhen (CN); Ying Shan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 658 days.

(21) Appl. No.: 17/983,302

(22) Filed: Nov. 8, 2022

(65) Prior Publication Data

US 2023/0072813 A1 Mar. 9, 2023

Related U.S. Application Data

(63) Continuation of application No. PCT/CN2022/079818, filed on Mar. 9, 2022.

(30) Foreign Application Priority Data

Apr. 8, 2021 (CN) .......................... 202110379725.6

(51) Int. Cl.
*G06T 7/254* (2017.01)
*G06T 3/18* (2024.01)
(Continued)

(52) U.S. Cl.
CPC ............... *G06T 7/254* (2017.01); *G06T 3/18* (2024.01); *G06T 3/4038* (2013.01); *G06V 10/462* (2022.01); *G06T 2207/20221* (2013.01)

(58) Field of Classification Search
CPC ......... G06T 7/254; G06T 3/18; G06T 3/4038; G06T 2207/20221; G06V 10/462
See application file for complete search history.

(56) References Cited

U.S. PATENT DOCUMENTS 11,582,519 B1 * 2/2023 Bhat .................. H04N 21/4666
2008/0024503 A1 1/2008 Smith
(Continued)

FOREIGN PATENT DOCUMENTS

CN 109241835 A 1/2019
CN 109951654 A 6/2019
(Continued)

OTHER PUBLICATIONS

Yao, Guangming; Mesh Guided One-shot Face Reenactment Using Graph Convolutional Network, Year 2020 (Year: 2020).*
(Continued)

*Primary Examiner* — Gregory A Morse
*Assistant Examiner* — Ty Mitchell Beatty
(74) *Attorney, Agent, or Firm* — Morgan, Lewis & Bockius LLP

(57) ABSTRACT

Disclosed are an image processing method performed by an electronic device. After a target image for motion transfer and at least one source image corresponding to the target image are acquired, multi-dimensional feature extraction is performed on the source and target images to acquire keypoint feature information of corresponding keypoints in the source and target images, and appearance feature information corresponding to the source image, and the keypoint feature information includes keypoint perspective information. Then, perspective transformation is performed on the keypoints according to the keypoint perspective information to acquire optic flow information of the keypoints. Motion information corresponding to the keypoints is then deter-
(Continued)

mined based on the optic flow information and the keypoint feature information, and the motion information and the appearance feature information are fused to acquire a processed image of an object in the source image after transferring motion of an object in the target image.

20 Claims, 7 Drawing Sheets

(51) Int. Cl.
    *G06T 3/4038*         (2024.01)
    *G06V 10/46*         (2022.01)

(56) References Cited

U.S. PATENT DOCUMENTS

| | | | |
|---|---|---|---|
| 2014/0104295 A1* | 4/2014 | Sorkine-Hornung | G09G 5/02 |
| | | | 345/646 |
| 2015/0094516 A1 | 4/2015 | Taguchi et al. | |
| 2017/0118357 A1* | 4/2017 | Morris | H04N 1/393 |
| 2018/0068178 A1* | 3/2018 | Theobalt | G06T 13/40 |
| 2018/0322680 A1* | 11/2018 | Mcelmurray | G06V 20/40 |
| 2019/0035080 A1 | 1/2019 | Bisker | |
| 2019/0122329 A1* | 4/2019 | Wang | G06V 30/19173 |
| 2020/0294294 A1* | 9/2020 | Petriv | G06N 3/08 |

FOREIGN PATENT DOCUMENTS

| | | |
|---|---|---|
| CN | 110197167 A | 9/2019 |
| CN | 110222565 A | 9/2019 |
| CN | 110717928 A | 1/2020 |
| CN | 110866864 A | 3/2020 |
| CN | 111161395 A | 5/2020 |
| CN | 112085774 A | 12/2020 |
| CN | 113706577 A | 11/2021 |

OTHER PUBLICATIONS

Tencent Technology, Extended European Search Report, EP Patent Application No. 22783830.7, May 6, 2024, 10 pgs.
Aliaksandr Siarohin et al., "Animating Arbitrary Objects Via Deep Motion Transfer", Proceedings of the IEEE/CVF Conference on Computer Vision and Pattern Recognition (CVPR), https://10.1109/CVPR.2019.00248, Jun. 2019, 10 pgs.
Daw-Tung Lin et al., "Facial Expression Morphing and Animation with Local Warping Methods", IEEE, Proceedings of the 10th International Conference on Image Analysis and Processing, https://10.1109/ICIAP.1999.797661, Sep. 1999, 6 pgs.
Guangming Yao et al., "Mesh Guided One-Shot Face Reenactment Using Graph Convolutional Networks", Proceedings of the 28th ACM International Conference on Multimedia, https://doi.org/10.1145/3394171.3413865, Oct. 2020, 17 pgs.
Xiang Wang et al., "A Survey on Face Data Augmentation", Computer Vision and Pattern Recognition, https://doi.org/10.48550/arXiv.1904.11685, Apr. 2019, 26 pgs.
ZiHe Qiu et al., "Image Stitching and Ghost Elimination Based on Shape-Preserving Half-Project Warps", 2015 IEEE International Conference on Information and Automation, https://10.1109/ICINFA.2015.7279725, Aug. 2015, 6 pgs.
Tencent Technology, ISR, PCT/CN2022/079818, Apr. 27, 2022, 3 pgs.
Tencent Technology, WO, PCT/CN2022/079818, Apr. 27, 2022, 5 pgs.
Tencent Technology, IPRP, PCT/CN2022/079818, Oct. 10, 2023, 6 pgs.

* cited by examiner

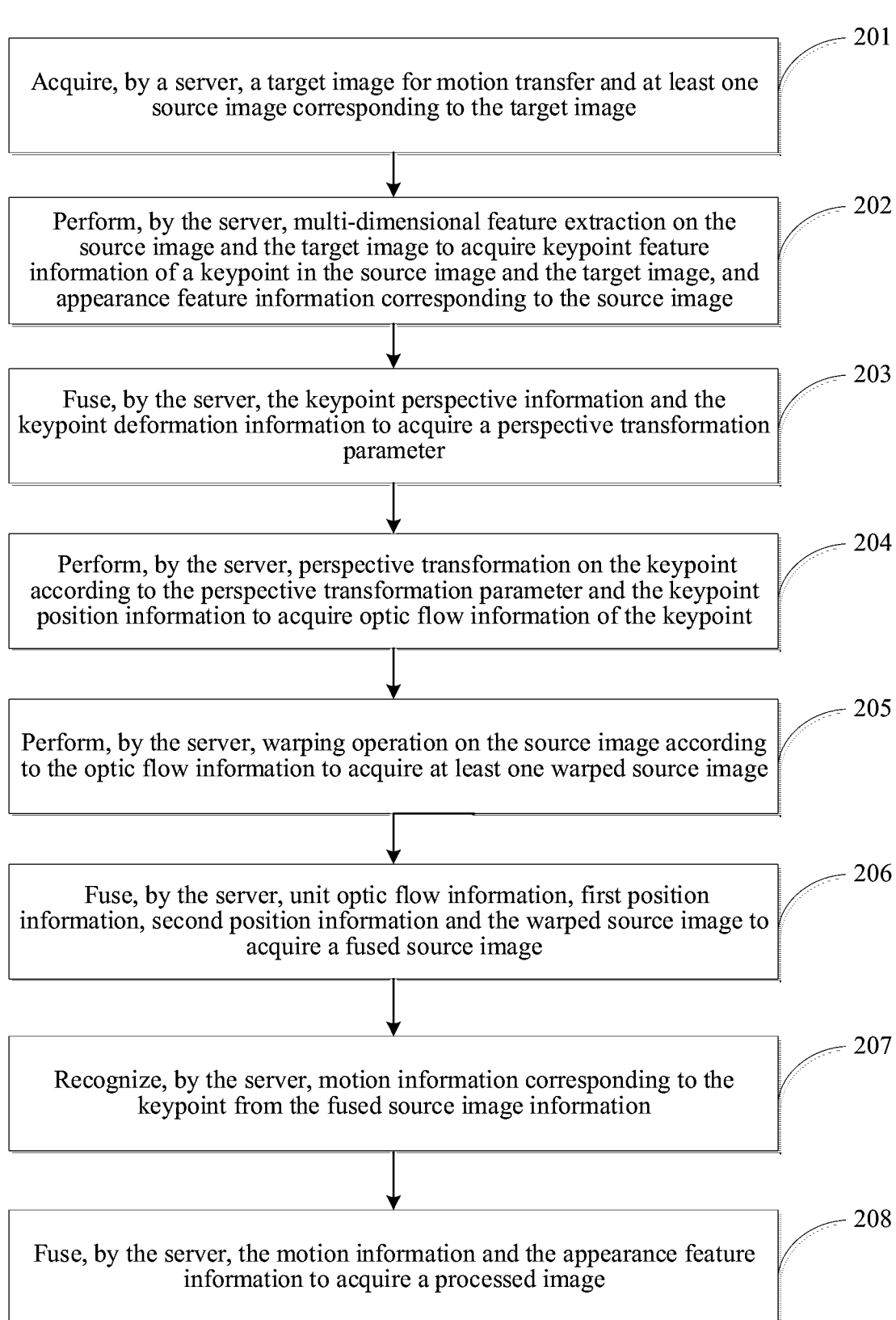

201

Acquire, by a server, a target image for motion transfer and at least one source image corresponding to the target image

202

Perform, by the server, multi-dimensional feature extraction on the source image and the target image to acquire keypoint feature information of a keypoint in the source image and the target image, and appearance feature information corresponding to the source image

203

Fuse, by the server, the keypoint perspective information and the keypoint deformation information to acquire a perspective transformation parameter

204

Perform, by the server, perspective transformation on the keypoint according to the perspective transformation parameter and the keypoint position information to acquire optic flow information of the keypoint

205

Perform, by the server, warping operation on the source image according to the optic flow information to acquire at least one warped source image

206

Fuse, by the server, unit optic flow information, first position information, second position information and the warped source image to acquire a fused source image

207

Recognize, by the server, motion information corresponding to the keypoint from the fused source image information

208

Fuse, by the server, the motion information and the appearance feature information to acquire a processed image

FIG. 5

IMAGE PROCESSING METHOD AND APPARATUS, ELECTRONIC DEVICE, AND STORAGE MEDIUM

CROSS-REFERENCE TO RELATED APPLICATION

This application is a continuation application of PCT Patent Application No. PCT/CN2022/079818, entitled "AN IMAGE PROCESSING METHOD, APPARATUS, ELECTRONIC DEVICE AND STORAGE MEDIUM" filed on Mar. 9, 2022, which claims priority to Chinese Patent Application No. 202110379725.6, filed with the State Intellectual Property Office of the People's Republic of China on Apr. 8, 2021, and entitled "IMAGE PROCESSING METHOD AND APPARATUS, AND COMPUTER READABLE STORAGE MEDIUM", all of which are incorporated herein by reference in their entirety.

FIELD OF THE TECHNOLOGY

This application relates to the technical field of communication, particularly relates to an image processing method and apparatus, and a computer readable storage medium.

BACKGROUND OF THE DISCLOSURE

In recent years, with the development of Internet technology, image processing has become more and more diverse. For example, the motion of an object in a target image can be migrated to another image to achieve an effect of showing the same motion sequence in another image. According to an existing image processing method, the motion transfer is completed by representing the motion through keypoint tracks or keypoint local affine transformation of a keypoint in the image.

In the study and practice process of the related art, the inventor of this application aims at overcoming the defects of an existing image processing method that local motion details cannot be accurately caught by using the keypoint tracks, and the complicated motion transformation problem cannot be solved through the keypoint local affine transformation, so that the image processing accuracy may be greatly reduced.

SUMMARY

Embodiments of this application provide an image processing method and apparatus, and a computer readable storage medium, capable of improving image processing accuracy.

An image processing method, performed by an electronic device, includes:

acquiring a target image for motion transfer and at least one source image corresponding to the target image;

performing multi-dimensional feature extraction on the source image and the target image to acquire keypoint feature information of corresponding keypoints in the source image and the target image, and appearance feature information corresponding to the source image, the keypoint feature information comprising keypoint perspective information;

performing perspective transformation on the keypoints according to the keypoint perspective information to acquire optic flow information of the keypoints, the optic flow information being used for indicating transformation information of the keypoints from the source image to the target image;

determining motion information corresponding to the keypoints based on the optic flow information and the keypoint feature information; and fusing the motion information and the appearance feature information to acquire a processed image, the processed image being an image acquired after transferring motion of an object in the target image to an object in the source image.

Correspondingly, the embodiments of this application provide an image processing apparatus, including:

an acquisition unit, configured to acquire a target image for motion transfer and at least one source image corresponding to the target image;

an extraction unit, configured to perform multi-dimensional feature extraction on the source image and the target image to acquire keypoint feature information of corresponding keypoints in the source image and the target image, and appearance feature information corresponding to the source image, the keypoint feature information including keypoint perspective information;

a perspective transformation unit, configured to perform perspective transformation on the keypoint according to the keypoint perspective information to acquire optic flow information of the keypoints, the optic flow information being used for indicating transformation information of the keypoints from the source image to the target image;

a determination unit, configured to determine motion information corresponding to the keypoints based on the optic flow information and the keypoint feature information; and a fusing unit, configured to fuse the motion information and the appearance feature information to acquire a processed image, the processed image being an image acquired after transferring motion of an object in the target image to an object in the source image.

In addition, an embodiment of this application further provides an electronic device, including a processor and a memory, the memory storing an application program, the processor being configured to run the application program in the memory and causing the electronic device to perform the image processing method provided in the embodiments of this application.

In addition, an embodiment of this application further provides a non-transitory computer readable storage medium, storing a plurality of instructions, the instructions being suitable for being loaded by a processor of an electronic device, causing the electronic device to perform the operations of any image processing method provided in the embodiments of this application.

According to the embodiments of this application, after the target image for motion transfer and at least one source image corresponding to the target image are acquired, multi-dimensional feature extraction is performed on the source image and the target image to acquire the keypoint feature information of the keypoint in the source image and the target image, and appearance feature information corresponding to the source image, and the keypoint feature information includes keypoint perspective information. Then, perspective transformation is performed on the keypoint according to the keypoint perspective information to acquire the optic flow information of the keypoint, and the optic flow information is used for indicating transformation information of the keypoint from the source image to the target image. Then, motion information corresponding to the keypoint is determined based on the optic flow information and the keypoint feature information, the motion information and the appearance feature information are fused to acquire a processed image, and the processed image is an image acquired after transferring motion of an object in the target image to an object in the source image. Since the motion is represented by performing perspective transformation on the keypoint of the target image and the source image according to this solution, a local motion detail can be accurately caught, complicated motion change can be treated, and problems such as great attitude change and serious background occlusion can be solved. Therefore, the image processing accuracy can be greatly improved.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

FIG. 5 is another schematic flowchart of an image processing method according to an embodiment of this application.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The embodiments of this application provide an image processing method and apparatus, and a computer readable storage medium. The image processing apparatus may be integrated into an electronic device. The electronic device may be a server, a terminal, or another device.

The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this application.

Figure 1:
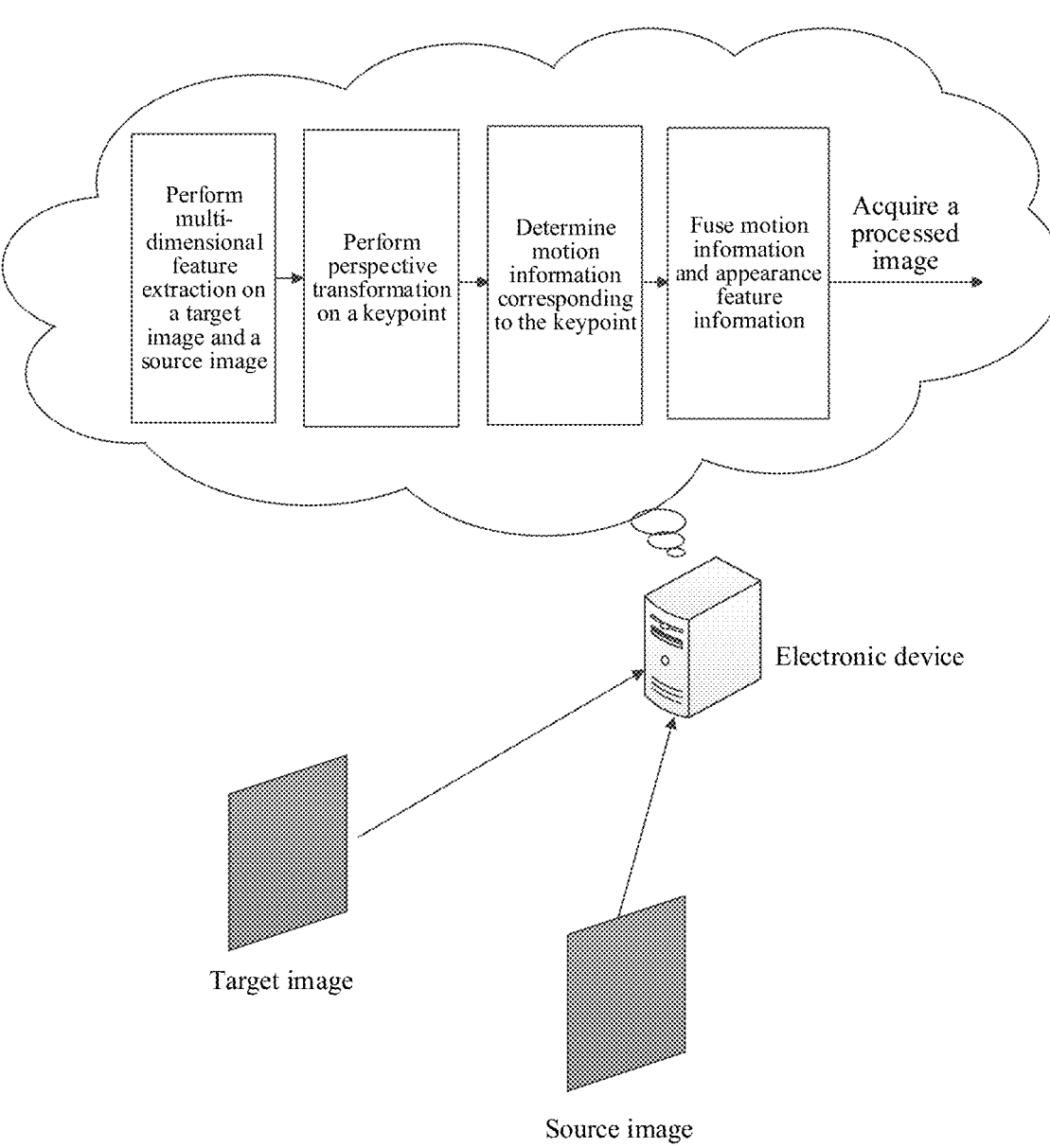
FIG. 1 is a schematic diagram of an image processing method according to an embodiment of this application.

For example, as shown in FIG. 1, by taking an image processing apparatus integrated in an electronic device as an example, after a target image for motion transfer and at least one source image corresponding to the target image are acquired by the electronic device, multi-dimensional feature extraction is performed on the source image and the target image to acquire keypoint feature information of a corresponding keypoint or keypoints in the source image and the target image, and appearance feature information corresponding to the source image, and the keypoint feature information includes keypoint perspective information. Then, perspective transformation is performed on the keypoint according to the keypoint perspective information to acquire optic flow information of the keypoint, and the optic flow information is used for indicating transformation information of the keypoint from the source image to the target image. Then, motion information corresponding to the keypoint is determined based on the optic flow information and the keypoint feature information, and the motion information and the appearance feature information are fused to acquire a processed image, and the processed image is an image acquired after transferring motion of an object in the target image to an object in the source image. In this application, the term "motion transfer" generally refers to the replacement or animation of the motion of one object (e.g., a real-life person or a character in the virtual world) using another object (e.g., another character in the virtual world or another real-life person).

The image processing method according to embodiments of this application relates to a computer vision direction in the field of artificial intelligence (AI). According to embodiments of this application, a processed image may be acquired by performing motion transfer on a target image and a source image.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. The AI is to study the design principles and implementation methods of various intelligent machines, to enable the machines to have the functions of perception, reasoning, and decision-making. AI technology is a comprehensive discipline, covering a wide range of fields including both a hardware-level technology and a software-level technology. AI software technologies mainly include several major directions such as a computer vision technology, and machine learning/deep learning.

The computer vision (CV) technology is a science that studies how to use a machine to "see", and furthermore, is machine vision that a computer is used for replacing human eyes to perform recognition, measurement, and the like on a target, and further perform image processing, so that the image is processed by the computer into an image that is more suitable for human eyes to observe, or an image transmitted to an instrument for detection. As a scientific discipline, the CV studies related theories and technologies and attempts to establish an AI system that can obtain information from images or multidimensional data. The CV technology generally includes technologies such as image processing and image recognition, and further includes biological feature recognition technologies such as common face recognition and human pose recognition.

Detailed descriptions are provided respectively in the following. A description order of the following embodiments is not construed as a limitation on a preferred order of the embodiments.

In this embodiment, description will be made from the perspective of an image processing apparatus. The image processing apparatus may be integrated in an electronic device. The electronic device may be a server, a terminal, or another device. The terminal may include a tablet computer, a notebook computer, a personal computer (PC), a wearable device, a virtual reality device, another intelligent device capable of performing image processing, or the like.

An image processing method, performed by an image processing apparatus, and performed by an electronic device in other words, includes:

A target image for motion transfer and at least one source image corresponding to the target image are acquired, multi-dimensional feature extraction is performed on the source image and the target image to acquire keypoint feature information of the keypoint in the source image and the target image, and appearance feature information corresponding to the source image, and the keypoint feature information includes keypoint perspective information. Perspective transformation is performed on the keypoint according to the keypoint perspective information to acquire optic flow information of the keypoint, and the optic flow information is used for indicating transformation information of the keypoint from the source image to the target image. Motion information corresponding to the keypoint is determined based on the optic flow information and the keypoint feature information, the motion information and the appearance feature information are fused to acquire a processed image, and the processed image is an image acquired after transferring motion of an object in the target image to an object in the source image.

Figure 2:
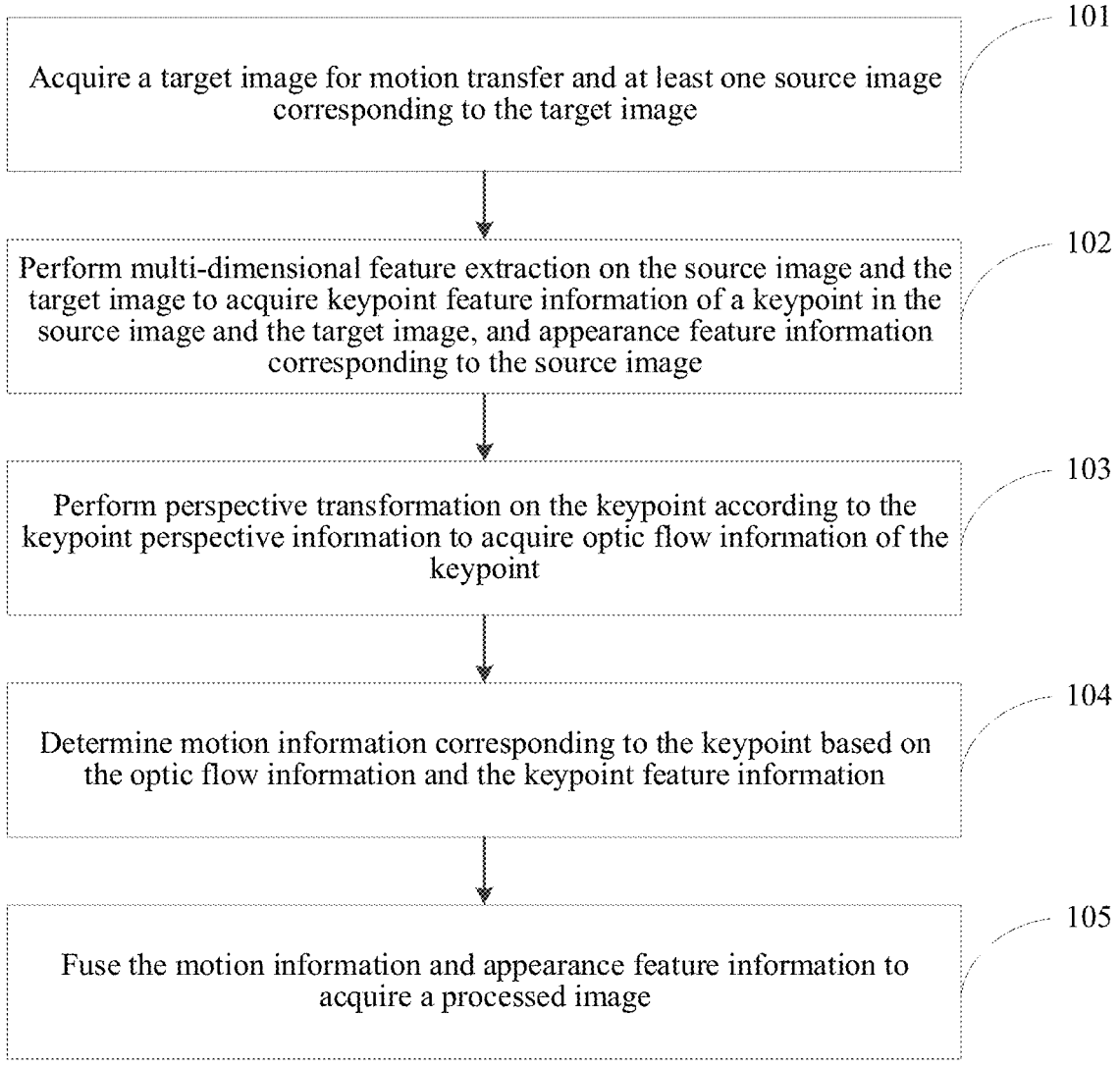
FIG. 2 is a schematic flowchart of an image processing method according to an embodiment of this application.

As shown in FIG. 2, a specific procedure of the image processing method is as follows:

101. A target image for motion transfer and at least one source image corresponding to the target image are acquired.

The target image is an image of motion information (attitude information) corresponding to a keypoint of a motion transfer providing object, the source image is an image to which the motion information corresponding to the keypoint is migrated, and the source image provides appearance information for motion transfer.

For example, the target image for motion transfer and at least one source image corresponding to the target image may be screened out from the same video. For example, a certain image frame including object motion may be screened out from a video to be used as the target image for motion transfer, and any one or a plurality of image frames may be screened out from other image frames of the same video to be used as the source image corresponding to the target image. The target image for motion transfer and at least one source image corresponding to the target image may be screened out from different videos. For example, any one image frame including object motion may be screened out from a certain video to be used as a target image for motion transfer, and any one or a plurality of image frames may be screened out from other videos to be used as the at least one source image corresponding to the target image. The image including the object motion uploaded by a user may be directly received or acquired to be used as the target image, one or a plurality of other uploaded images are used as the source image corresponding to the target image, an image including the object motion may also be crawled from Internet to be used as the target image, and at least one another image is crawled to be used as the source image corresponding to the target image.

The quantity of the target image for motion transfer is one, and the quantity of the source image corresponding to the target image may be one or several.

102. Multi-dimensional feature extraction is performed on the source image and the target image to acquire keypoint feature information of a corresponding keypoint or keypoints in the source image and the target image, and appearance feature information corresponding to the source image.

The keypoint feature information includes keypoint perspective information. For a kind of objects (substances), supposed that the object includes K portions, a position of each portion may be expressed by one keypoint, the keypoint may be an eye, a nose, an eyebrow or a point capable of expressing a certain portion of the object, the keypoint feature information may be feature information of the keypoint in the target image, and the keypoint feature information may further include keypoint position information and keypoint deformation information. The keypoint position information may be position information of the keypoint in the target image and the source image, and the keypoint deformation information may be shape change information of the keypoint from the source image to the target image. The appearance feature information may be feature information, except for the object motion, in the source image.

For example, feature extraction may be performed on the keypoint in the source image and the target image by using a keypoint detection network of the trained processing model, to acquire keypoint feature information of the keypoint in the source image and keypoint feature information of the keypoint in the target image. For example, a keypoint item $p_k$, a Jacobi item $J_k$ and a perspective item $q_k$ corresponding to the keypoint in the source image and the target image are estimated by a keypoint detector (KD). The keypoint item $p_k$ is used as keypoint position information corresponding to the source image and the target image, the Jacobi item $J_k$ is used as keypoint deformation information corresponding to the source image and the target image, the perspective item $q_k$ is used as keypoint perspective information corresponding to the source image and the target image, and the keypoint position information, the keypoint deformation information and the keypoint perspective information are used as keypoint feature information. Feature extraction is performed on an appearance feature of the source image by using an appearance feature network of the trained processing model, to acquire appearance feature information corresponding to the source image. For example, the appearance feature of the source image is coded by using a coding network of a generator (G), to acquire appearance feature information corresponding to the source image.

103. Perspective transformation is performed on the keypoint according to the keypoint perspective information to acquire optic flow information of the keypoint.

The optic flow information is used for indicating transformation information of the keypoint from the source image to the target image, and for example, the information may be a backward optic flow $$\mathcal{T}_{S \leftarrow \mathcal{D}}^h$$

of the keypoint from the source image (S) to the target image (D).

The perspective transformation may represent 3D transformation motion. For example, when a face pitch and yaw change, a corresponding motion includes 3D rotation.

For example, the keypoint perspective information and the keypoint deformation information may be fused to acquire a perspective transformation parameter, and perspective transformation is performed on the keypoint according to the perspective transformation parameter and the keypoint position information to acquire optic flow information of the keypoint. A specific procedure may be as follows:

S1. The keypoint perspective information and the keypoint deformation information are fused to acquire a perspective transformation parameter.

The perspective transformation parameter may be a perspective transformation matrix for performing perspective transformation on the keypoint. The perspective transformation matrix may include keypoint deformation information and keypoint perspective information. A size of the perspective transformation matrix may be set according to practical application. For example, the perspective transformation matrix may be a matrix in a size of 3*3 or in another size.

For example, a first initial perspective transformation parameter of the source image and a second initial perspective transformation parameter of the target image are respectively constructed based on the keypoint perspective information and the keypoint deformation information. For example, first perspective information of the keypoint in the source image and second perspective information of the keypoint in the target image are screened from the keypoint perspective information. For example, $$q_k^S$$

corresponding to the source image (S) and $$q_k^D$$

corresponding to the target image (D) are screened from $q_k$, the $$q_k^S$$

is used as the first perspective information, the $$q_k^D$$

is used as the second perspective information, and each of $$q_k^S$$

and $$q_k^D$$

is a 1×2 matrix. The first deformation information of the keypoint in the source image and the second deformation information of the keypoint in the target image are screened out from the keypoint deformation information. For example, $$J_k^S$$

corresponding to the source image (S) and $$J_k^D$$

corresponding to the target image (D) are screened out from $J_k$, the $$J_k^S$$

is used as the first deformation information, and the $$J_k^D$$

is used as the second deformation information. The first perspective information and the first deformation information are fused to acquire a first initial perspective transformation parameter of the source image, and the second perspective information and the second deformation information are fused to acquire a second initial perspective transformation parameter of the target image. For example, the $$J_k^S$$

and the $$J_k^D$$

are expanded. A specific expansion formula is as shown by Formula (1) below.

$$\tilde{J}_k^S \text{ and } \tilde{J}_k^D$$

are respectively used as the first initial perspective transformation parameter of the source image (S) and the second initial perspective transformation parameter of the target image (D). The specific formula is as follows:

$$
\mathcal{J}_k^S = \begin{bmatrix} J_{k_{11}}^S & J_{k_{13}}^S & 0 \\ J_{k_{21}}^S & J_{k_{22}}^S & 0 \\ q_{k_{11}}^S & q_{k_{12}}^S & 1 \end{bmatrix} \mathcal{J}_k^D = \begin{bmatrix} J_{k_{11}}^D & J_{k_{12}}^D & 0 \\ J_{k_{21}}^D & J_{k_{22}}^D & 0 \\ q_{k_{11}}^D & q_{k_{12}}^D & 1 \end{bmatrix} \tag{1}
$$

The first initial perspective transformation parameter and the second initial perspective transformation parameter are fused to acquire the perspective transformation parameter. For example, the $$
\tilde{J}_k^S \text{ and the } \tilde{J}_k^D
$$

are fused, and the fused $$
\left(\tilde{J}_k^S\right)\left(\tilde{J}_k^D\right)^{-1}
$$

is used as the perspective transformation parameter.

S2. Perspective transformation is performed on the keypoint according to the perspective transformation parameter and the keypoint position information to acquire optic flow information of the keypoint.

For example, unit optic flow information of the keypoint is acquired. The unit optic flow information is optic flow information corresponding to a warping operation between the source image and the target image. The first position information of the keypoint in the source image and the second position information of the keypoint in the target image are respectively screened out from the keypoint position information. For example, first position information $$
p_k^S
$$

of the keypoint in the source image (S) and second position information $$
p_k^D
$$

of the keypoint in the target image (D) are screened out from $p_k$. Perspective transformation is performed on the keypoint according to the unit optic flow information, the second position information and the perspective transformation parameter to acquire initial optic flow information of the keypoint. The first position information and the initial optic flow information are fused to acquire the optic flow information of the keypoint. The procedure may be specifically as shown by Formula (2).

$$
\mathcal{J}_{S\leftarrow D}^h \approx p_k^S + \mathcal{P}\left((\tilde{J}_k^S)(\tilde{J}_k^D)^{-1}, \mathcal{J}_{S\leftarrow D}^0 - p_k^D\right) \tag{2}
$$

In the formula, P is initial optic flow information acquired after perspective transformation operation, $$
\mathcal{T}_{S\leftarrow D}^h
$$

is optic flow information of the keypoint, $$
\mathcal{T}_{S\leftarrow D}^0
$$

is unit optic flow information satisfying $$
\mathcal{F}(S, \mathcal{T}_{S\leftarrow D}^0) = S,
$$

and $\mathcal{F}$ represents backward warping operation. In comparison to affine transformation, perspective transformation achieves an effect of learning complicated 2D and 3D combined transformation through different $p_k$, $J_k$ and $q_k$ values for $$
\mathcal{J}_{S\leftarrow D}^h.
$$

Reference to Formula (3) and Formula (4) may be taken for specific procedures of the perspective transformation operation on the keypoint.

$$
\begin{bmatrix} u \\ v \\ w \end{bmatrix} = \begin{bmatrix} a_{11} & a_{12} & 0 \\ a_{21} & a_{22} & 0 \\ a_{31} & a_{32} & 1 \end{bmatrix} \begin{bmatrix} x \\ y \\ 1 \end{bmatrix} \tag{3}
$$

$$
x' = \frac{u}{w} \quad y' = \frac{v}{w} \tag{4}
$$

In the formulas, x' and y' represent attitude information of the keypoint after the perspective transformation operation. $a_{11}$ and $a_{22}$ represent scaling items, $a_{12}$ and $a_{21}$ are rotation items, and $a_{13}$ and $a_{31}$ are 3D transformation items.

When $q_k=[0,0]$, the perspective transformation operation is degraded to affine transformation. Further, when $$
J_k = \begin{bmatrix} 1 & 0 \\ 0 & 1 \end{bmatrix},
$$

the perspective transformation operation is degraded to keypoint track transformation. The perspective transformation is sensitive to values of $a_{13}$ and $a_{31}$, so the following limitation needs to be adopted for ensuring processing model training stability.

$$
|q_{k_{11}}|_1 \le \alpha |q_{k_{12}}|_1 \le \alpha
$$

In the formula, $|\cdot|$ represents an $\mathcal{L}_1$ norm, and $\alpha$ is a hyper-parameter to be adjusted.

Figure 3:
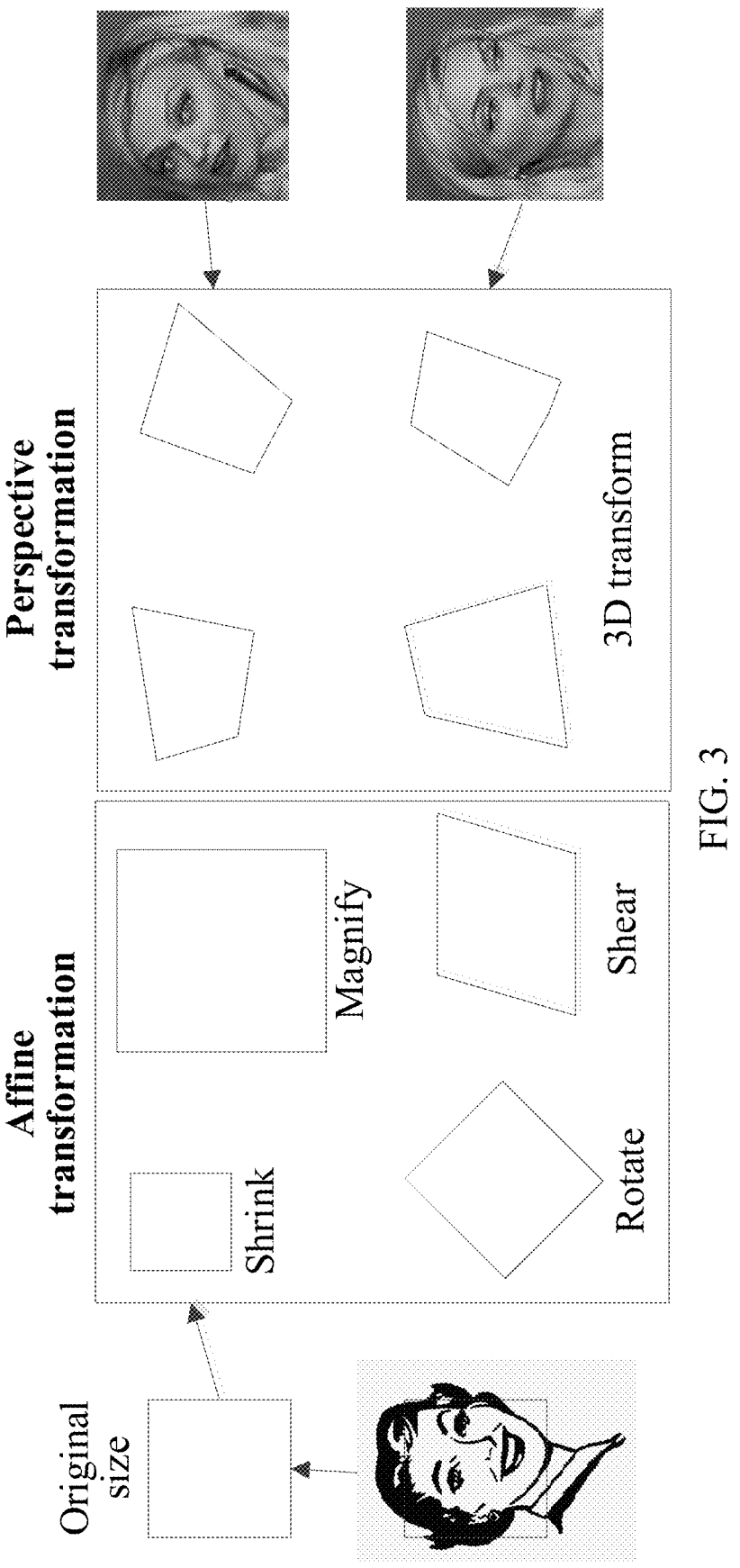
FIG. 3 is a schematic diagram of motion representation of perspective transformation and affine transformation according to an embodiment of this application.

The perspective transformation operation is most different from the affine transformation in that the affine transformation only includes 2D transformation, such as affine transformation in other types of zooming, rotation, inclined shearing, reflection, etc. During processing of motion including 3D transformation, the motion may be represented by a series of learnable keypoints and corresponding local perspective transformation. As shown in FIG. 3, transformation types covered by the perspective transformation are richer than those of affine transformation.

104. Motion information corresponding to the keypoint is determined based on the optic flow information and the keypoint feature information.

For example, the warping operation may be performed on the source image according to the optic flow information to acquire at least one warped source image. The unit optic flow information, the first position information, the second position information and the warped source image are fused to acquire a fused source image, and the motion information corresponding to the keypoint is recognized from the fused source image. A specific procedure may be as follows:

(1) Warping operation is performed on the source image according to the optic flow information to acquire at least one warped source image.

For example, the warping operation is performed on each source image based on a backward optic flow $$\mathcal{T}^h_{S \leftarrow D}$$

of a sparse motion field corresponding to each pair of keypoints, to acquire K warped images $S^k$, and the warped images are used as warped source images.

(2) The unit optic flow information, the first position information, the second position information and the warped source image are fused to acquire the fused source image.

For example, a first position difference value of the first position information and the unit optic flow information is calculated, and a second position difference value of the second position information and the unit optic flow information is calculated. Transformation position information of the keypoint is determined according to the first position difference value and the second position difference value. For example, a differential heat map for indicating the transformation transmitting position may be calculated by the following formula, and the differential heat map is used as the transformation position information of the keypoint. A specific procedure may be as shown by Formula (5).

$$H^k = e^{\left(\frac{(p^D_k - \mathcal{T}^0_{S \leftarrow D})^2}{\sigma}\right)} - e^{\left(\frac{(p^S_k - \mathcal{T}^0_{S \leftarrow D})^2}{\sigma}\right)} \qquad (5)$$

In the formula, $H^k$ is transformation position information of the keypoint, e is an exponential function, $\sigma = 0.01$, $$(p^D_k - \mathcal{T}^0_{S \leftarrow D})$$

is a second position difference value, and $$(p^S_k - \mathcal{T}^0_{S \leftarrow D})$$

is a first position difference value.

The transformation position information and the warped source image are stitched to acquire fused source image information. For example, depth information of the differential heat map and the warped source image is acquired, and the differential heat map and the warped source image are stitched based on the depth information to acquire the fused source image information.

(3) Motion information corresponding to the keypoint is recognized from the fused source image information.

The motion information may be motion representation information of the keypoint from the source image to the target image, and the motion information may include attitude information, occlusion information of the source image and an attention weight.

For example, multi-dimensional feature extraction is performed on the fused source image information by using a trained processing model to acquire local motion feature information of the keypoint, occlusion information of the source image and an attention weight. For example, multi-dimensional feature extraction may be performed on the fused source image information by using a dense motion network (DM) of the trained processing model to acquire the local motion feature information of the keypoint, the occlusion information of the source image and the attention weight. The occlusion information may be an occlusion map $O_{S \leftarrow D} \in [0,1]^{H \times W}$ for learning an occlusion region in the source image (S), and an expected content in the target image (D) can be acquired after this region is filled. The local motion feature information is weighted to acquire weighted motion feature information of the keypoint. For example, the local motion feature information may be weighted in a space weighting manner to acquire weighted motion feature information. The weighted motion feature information is fused to acquire attitude information of the object in the target image. For example, the attitude information of the object in the target image may be acquired by a calculation method according to Formula (6) as follows:

$$\mathcal{T}_{S \leftarrow D} = M_0 \mathcal{T}^0_{S \leftarrow D} + \sum_{k=1}^{K} M_k \mathcal{T}^h_{S \leftarrow D} \qquad (6)$$

In the formula, $\mathcal{T}_{S \leftarrow D}$ is attitude information, $$M_0 \mathcal{T}^0_{S \leftarrow D}$$

is used for learning a still-keeping background content, and $M \in [0,1]^{(K+1) \times H \times W}$ is a weight item satisfying $$\sum_{k=0}^{K} M_{k,i,j} = 1.$$

The attitude information, the occlusion information and the attention weight are used as the motion information of the keypoint.

The trained processing model may be preset by operation and maintenance personnel, and may also be acquired through training by the image processing apparatus. That is, before the step of performing multi-dimensional feature extraction on the fused source image information by using a trained processing model to acquire local motion feature information of the keypoint, the image processing method may further include:

A source image sample and a target image sample are acquired, motion transfer is performed on an object in the source image sample and the target image sample by using a preset processing model to acquire a target motion image. The preset processing model is converged according to the target motion image and the target image sample to acquire the trained processing model. A specific procedure may be as follows:

(1) The source image sample and the target image sample are acquired.

For example, a source image sample and a target image sample may be acquired from video data. For example, an image frame including object motion may be acquired from one or a plurality of videos, and one or a plurality of different image frames are acquired to be used as the source image sample corresponding to the target image sample. The source image sample and the target image sample may also be acquired from a database or network. For example, the target image sample including the object motion and at least one source image corresponding to the target image sample may also be acquired from the database or the network.

(2) Motion migration is performed on an object in the source image sample and the target image sample by using a preset processing model to acquire a target motion image.

For example, multi-dimensional feature extraction is performed on the source image sample and the target image sample by using a feature extraction network of the preset processing model to acquire keypoint feature information of the keypoint in the source image sample and the target image sample, and appearance feature information corresponding to the source image sample, and the keypoint feature information includes keypoint perspective information. Perspective transformation is performed on the keypoint according to the keypoint perspective information to acquire the optic flow information of the keypoint. Motion information corresponding to the keypoint is determined based on the optic flow information and the keypoint feature information, and the motion information and appearance feature information are fused to acquire the target motion image.

(3) The preset processing model is converged according to the target motion image and the target image sample to acquire the trained processing model.

For example, the sizes of the target motion image and the target image sample are adjusted to acquire feature loss information between the target motion image and the target image sample. For example, the target motion image and the target image sample may be zoomed to 1.0, 0.5, 0.25 and 0.125 of an original resolution, the values are respectively input into pre-trained VGG-19 models, and then, input value differences between the target motion image and the target image sample at a plurality of specific layers are acquired through comparison, so that the feature loss information between the target motion image and the target image sample is acquired. A calculation process of the feature loss information may be as shown by Formula (7). A specific procedure may be as follows:

$$\mathcal{L}_{rec}(\hat{D}, D) = \sum_{s=1}^{S}\sum_{i=1}^{I}\left|V_i(\hat{D}_s) - V_i(D_s)\right|_1 \tag{7}$$

In the formula, $\mathcal{L}_{rec}(\hat{D}, D)$ is feature loss information, $\hat{D}_s$ and $D_s$ represent a zoomed image at an s-th scale, and $V_i(\bullet)$ represents i-th layer output of VGG-19.

Space transformation is performed on the target image sample, and equivariance loss information between the target image sample and a space transformed image is calculated. For example, known space transformation $\mathcal{T}_{D \leftarrow y}$ is performed on the target image sample (D). For example, the space transformation may be thin plate spline transformation, a deformed image (Y) is acquired, and the deformed image is used as the space transformed image. Keypoint feature extraction is performed on the target image sample and the space transformed image to acquire the keypoint feature information of the target image sample and the keypoint feature information of the space transformed image, the keypoint feature information of the target image sample includes first keypoint position information and first keypoint deformation information, and the keypoint feature information of the space transformed image includes second keypoint position information and second keypoint deformation information. For example, feature extraction is performed on the keypoint of the target image sample and the space transformed image to acquire $p_k$ and $J_k$, $$p_k^D$$

of the target image sample is screened out from $p_k$ to be used as the first keypoint position information, $$p_k^Y$$

of the space transformed image is screened out from $p_k$ to be used as the second keypoint position information, $$J_k^D$$

of the target image sample is screened out from $J_k$ to be used as the first keypoint deformation information, and $$J_k^Y$$

of the space transformed image is screened out from $J_k$ to be used as the second keypoint deformation information. The keypoint position loss information is determined according to the first keypoint position information and the second keypoint position information. For example, the keypoint position loss information may be acquired through calculation according to Formula (8) as follows:

$$\mathcal{L}_{eqp} = \left|p_k^D - \mathcal{T}_{D \leftarrow y} \circ p_k^Y\right|_1 \tag{8}$$

In the formula, $\mathcal{L}_{eq,p}$ is keypoint position loss information, $$p_k^D$$

is first keypoint position information, $$p_k^Y$$

15

16 is second keypoint position information, and $\mathcal{T}_{D \leftarrow y}$ is optic flow information of the keypoint after space transformation on the target image sample.

The keypoint deformation loss information is determined according to the first keypoint deformation information and the second keypoint deformation information. For example, the keypoint deformation loss information may be acquired through calculation according to Formula (9) as follows:

$$\mathcal{L}_{eqj} = \left\| \begin{bmatrix} 1 & 0 \\ 0 & 1 \end{bmatrix} - (J_k^D)^{-1}(J_k^{D \leftarrow Y})(J_k^Y) \right\|_1 \tag{9}$$

In the formula, $\mathcal{L}_{eqj}$ is keypoint deformation loss information, $$J_k^D$$

is first keypoint deformation information, $$J_k^Y$$

is second keypoint deformation information, and $$J_k^{D \leftarrow Y} = \frac{d}{dp}\mathcal{T}_{D \leftarrow y}(p)\Big|_{p=p_k^Y}$$

represents a Jacobi item of $\mathcal{T}_{D \leftarrow y}$ in a position $$p_k^Y.$$

The keypoint position loss information and the keypoint deformation loss information are used as the equivariance loss information between the target image sample and the space transformed image.

The feature loss information and the equivariance loss information are fused to acquire target loss information of the target image sample. For example, the target loss information of the target image sample may be acquired by adding the feature loss information, the keypoint position loss information and the keypoint deformation loss information. A specific procedure may be as shown by Formula (10).

$$\mathcal{L} = \mathcal{L}_{rec} + \mathcal{L}_{eq,p} + \mathcal{L}_{eq,j} \tag{10}$$

In the formula, $\mathcal{L}$ is target loss information of the target image sample, $\mathcal{L}_{rec}$ is feature loss information, $\mathcal{L}_{eq,p}$ is keypoint position loss information, and $\mathcal{L}_{eq,j}$ is keypoint deformation loss information.

Based on the target loss information, the preset processing model is converged to acquire the trained processing model. For example, a network parameter of the preset processing model may be updated based on the target loss information, to acquire the trained processing model. A calculation method for updating the network parameter may be a gradient descent calculation method or other updating calculation methods.

The trained processing model includes a plurality of sub-networks, for example, may include a keypoint detection network (KD), an appearance feature network (G) and a dense motion network (DM). Each of the KD and the DM uses a U-Net structure (a network structure), and may include a plurality of upper sampling blocks and lower sampling blocks. The quantities of the upper sampling blocks and the lower sampling blocks may be selected according to practical application. For example, 5 upper sampling blocks and 5 lower sampling blocks may be included, and skip edge connectors corresponding to the upper sampling blocks and the lower sampling blocks may also be included. The G may include a plurality of upper sampling blocks, lower sampling blocks and residual blocks, the quantity of the blocks may also be selected according to practical application. For example, 2 upper sampling blocks, 6 residual blocks and 2 lower sampling blocks may be included.

105. The motion information and the appearance feature information are fused to acquire a processed image.

The processed image is an image acquired after transferring motion of an object in the target image to an object in the source image.

For example, the attitude information, the occlusion information and the appearance feature information may be fused to acquire initial image information. For example, by taking the appearance feature information being $\xi \in R^{C \times H \times W}$ as an example, according to the attitude information, backward warping operation is performed on the appearance feature information, and then, the information after the backward warping operation is fused with the occlusion information to acquire the initial image information. A specific calculation formula may be as shown by Formula (11).

$$\xi' = O_{S \leftarrow D} \odot \mathcal{F}(\xi, \mathcal{T}_{S \leftarrow D}) \tag{11}$$

In the formula, $\xi'$ is initial image information, $O_{S \leftarrow D}$ is occlusion information, $\xi$ is appearance feature information, $\mathcal{F}$ represents backward warping operation, and $\mathcal{T}_{S \leftarrow D}$ is attitude information.

The initial image information is weighted based on the attention weight to acquire target image information. For example, normalization processing is performed on the attention weight to acquire a weight parameter of each pixel position in the source image. For example, N source images $S_{(n)}$ at different attitudes of the same object are given, corresponding appearance feature thereto $$\xi'_{(n)}$$

is acquired according to Formula (11), and these appearance features are combined through the attention weight, and are used for learning relevance among all pixels of the source image $S_{(n)}$ and the target image D. Through softmax, the weight sum corresponding to each pixel position is 1, so that attitudes which are never seen before in a training stage may be better trained. A specific procedure may be as shown by Formula (12).

$$A_{(n)}^{i,j} = \frac{e^{A_{(n)}^{i,j}}}{\sum_{n=1}^{N} be^{A_{(n)}^{i,j}}} \tag{12}$$

In the formula, $$A_{(n)}^{i,j}$$

is a weighted parameter and used for measuring relative importance of different $\xi'$, and $A_{(n)} \in^{H \times W}$ is an attention weight.

The initial image information is weighted according to the weighted parameter to acquire the weighted image information. For example, image information corresponding to each pixel position in the initial image information may be weighted based on the weighted parameter to acquire the weighted image information. The weighted image information is fused to acquire the target image information. Reference to Formula (13) may be taken for a specific fusing process.

$$\tilde{\xi} = \sum_{n=1}^{N} \xi'_{(n)} \odot \hat{A}_{(n)} \tag{13}$$

In the formula, $\tilde{\xi}$ is target image information, $$\xi'_{(n)}$$

is initial image information, and $\widehat{A_{(n)}}$ is a weighted parameter.

The processed image is generated according to the target image information. For example, the target image information may be decoded by using a decoder of an appearance feature network of the trained processing model, to acquire the processed image.

Figure 4:
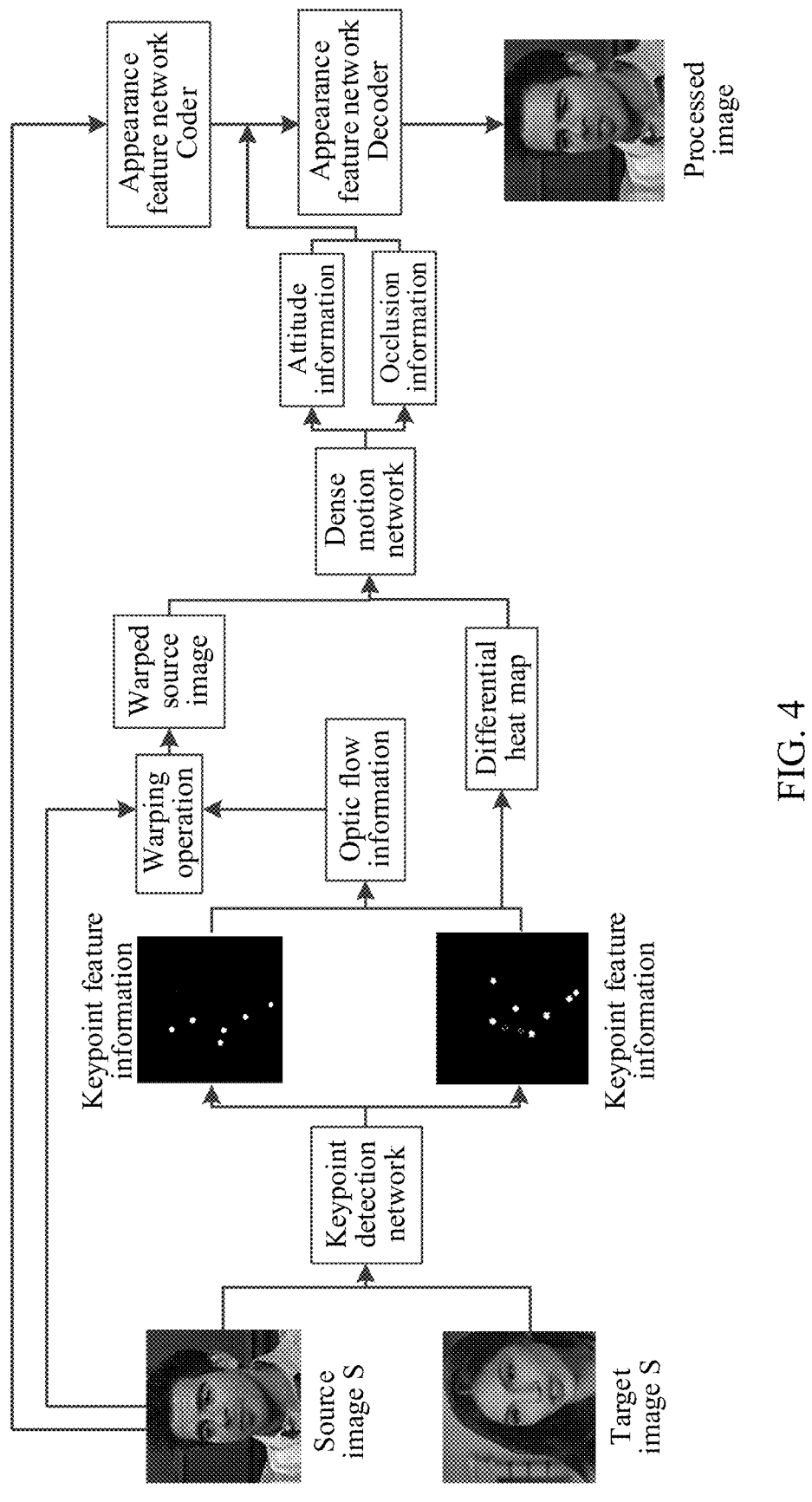
FIG. 4 is a schematic flowchart of motion transfer according to an embodiment of this application.

The image processing may be regarded as a procedure that an image frame is selected from one or a plurality of videos to be used as a target image (D), one or a plurality of different image frames are selected to be used as a source image (S), reconstruction is needed for a motion transfer task based on the appearance information of S and the attitude information of D, a reconstructed image $\hat{D}$ is acquired, the $\hat{D}$ may be used as the processed image, and the processed image is to have possibly similar motion to the target image. A specific process of motion transfer may be as shown in FIG. 4. The keypoint item $p_k$, the Jacobi item $J_k$ and a perspective item $q_k$ corresponding to the S and D are estimated by a keypoint detector (KD), and a backward optic flow $$\mathcal{T}_{S \leftarrow D}^{k}$$

from S to D is acquired through further calculation. Warping operation is performed on the source image S based on the backward optic flow $$\mathcal{T}_{S \leftarrow D}^{k}$$

of the sparse motion field corresponding to each pair of keypoints, to acquire a plurality of warped images $S^k$, the $S^k$ and the differential heat map $H^k$ are stitched to be used as the input of a dense motion network, and the output of the network is attitude information $\mathcal{T}_{S \leftarrow D}$ and an occlusion map $\mathcal{O}_{S \leftarrow D}$ of the dense motion field. Finally, the source image S is input into the generator, a recessive feature acquired through coding is processed based on $\mathcal{T}_{S \leftarrow D}$ and $\mathcal{O}_{S \leftarrow D}$, and a reconstructed image $\hat{D}$ is output after decoding.

From the above, according to embodiments of this application, after the target image for motion transfer and at least one source image corresponding to the target image are acquired, multi-dimensional feature extraction is performed on the source image and the target image to acquire the keypoint feature information of the keypoint in the source image and the target image, and appearance feature information corresponding to the source image, and the keypoint feature information includes keypoint perspective information. Then, perspective transformation is performed on the keypoint according to the keypoint perspective information to acquire the optic flow information of the keypoint, and the optic flow information is used for indicating transformation information of the keypoint from the source image to the target image. Then, motion information corresponding to the keypoint is determined based on the optic flow information and the keypoint feature information, the motion information and the appearance feature information are fused to acquire a processed image, and the processed image is an image acquired after transferring motion of an object in the target image to an object in the source image. Since the motion is represented by performing perspective transformation on the keypoint of the target image and the source image according to this solution, a local motion detail can be accurately caught, complicated motion change can be treated, and problems such as great attitude change and serious background occlusion can be solved. Therefore, the image processing accuracy can be greatly improved.

According to the method described in the foregoing embodiments, the following further provides detailed descriptions by using examples.

In this embodiment, illustration will be made by taking an example in which an image processing apparatus is specifically integrated in an electronic device, and the electronic device is a server.

I. Training of Processing Model (1) The source image sample and the target image sample are acquired by the server.

For example, an image frame including the object motion may be acquired by the server from one or a plurality of videos to be used as a target image sample, and one or a plurality of different image frames may be acquired to be used as a source image sample corresponding to the target image sample. A target image sample including the object motion and at least one source image corresponding to the target image sample may also be acquired from a database or a network.

(2) Motion migration is performed on an object in the source image sample and the target image sample by the server by using a preset processing model to acquire the target motion image.

For example, multi-dimensional feature extraction is performed on the source image sample and the target image sample by the server by using a feature extraction network of the preset processing model to acquire keypoint feature information of the keypoint in the source image sample and the target image sample, and appearance feature information corresponding to the source image sample, and the keypoint feature information includes keypoint perspective information. Perspective transformation is performed on the keypoint according to the keypoint perspective information to acquire the optic flow information of the keypoint. Motion information corresponding to the keypoint is determined based on the optic flow information and the keypoint feature information, and the motion information and appearance feature information are fused to acquire the target motion image.

(3) The preset processing model is converged by the server according to the target motion image and the target image sample to acquire the trained processing model.

For example, the target motion image and the target image sample may be zoomed to 1.0, 0.5, 0.25 and 0.125 of an original resolution by the server, the values are respectively input into pre-trained VGG-19 models, and then, input value differences between the target motion image and the target image sample at a plurality of specific layers are acquired through comparison, so that the feature loss information between the target motion image and the target image sample is acquired. A calculation process of the feature loss information may be as shown by Formula (7).

Known space transformation $\mathcal{T}_{D \leftarrow y}$ is performed on the target image sample (D) by the server. For example, the space transformation may be thin plate spline transformation, a deformed image (Y) is acquired, and the deformed image is used as the space transformed image. Feature extraction is performed on the keypoint of the target image sample and the space transformed image to acquire $p_k$ and $J_k$, $$p_k^D$$

of the target image sample is screened out from $p_k$ to be used as the first keypoint position information, $$p_k^Y$$

of the space transformed image is screened out from $p_k$ to be used as the second keypoint position information, $$J_k^D$$

of the target image sample is screened out from $J_k$ to be used as the first keypoint deformation information, and $$J_k^Y$$

of the space transformed image is screened out from $J_k$ to be used as the second keypoint deformation information. The keypoint position loss information is acquired through calculation according to the first keypoint position information and the second keypoint position information by using Formula (8). The keypoint deformation loss information is acquired through calculation according to the first keypoint deformation information and the second keypoint deformation information by using Formula (9). The keypoint position loss information and the keypoint deformation loss information are used as the equivariance loss information between the target image sample and the space transformed image.

The target loss information of the target image sample may be acquired by adding the feature loss information, the keypoint position loss information and the keypoint deformation loss information by the server. A specific procedure may be as shown by Formula (10). Based on the target loss information, a network parameter of the preset processing model is updated by using a gradient descent calculation method or other calculation methods, to acquire the trained processing model.

II. Processing on Target Image and Source Image by Trained Processing Model

The trained processing model may include a keypoint detection network (KD), an appearance feature network (G) and a dense motion network (DM). Each of the KD and the DM may include 5 upper sampling blocks, 5 lower sampling blocks and corresponding skip edge connectors. The G may include 2 upper sampling blocks, 6 residual blocks and 2 lower sampling blocks.

As shown in FIG. 5, a specific procedure of an image processing method is as follows:

201. A target image for motion transfer and at least one source image corresponding to the target image are acquired by the server.

For example, a certain image frame including the object motion may be screened out from a video by the server to be used as the target image for motion transfer, any one or a plurality of image frames are screened out from other image frames of the same video to be used as the source image corresponding to the target image, any one image frame including the object motion may be screened out from a certain video to be used as the target image for motion transfer, and any one or a plurality of image frames may be screened out from other videos to be used as at least one source image corresponding to the target image. The image including the object motion uploaded by a user may be directly received or acquired by the server to be used as the target image, one or a plurality of other uploaded images are used as the source image corresponding to the target image, an image including the object motion may also be crawled from Internet to be used as the target image, and then at least one another image is crawled to be used as the source image corresponding to the target image.

202. Multi-dimensional feature extraction is performed on the source image and the target image by the server to acquire keypoint feature information of a corresponding keypoint or keypoints in the source image and the target image, and appearance feature information corresponding to the source image.

For example, a keypoint item $p_k$, a Jacobi item $J_k$ and a perspective item $q_k$ corresponding to the keypoint in the source image and the target image are estimated by the server by using a keypoint detection network (KD). The keypoint item $p_k$ is used as keypoint position information corresponding to the source image and the target image, the Jacobi item $J_k$ is used as keypoint deformation information corresponding to the source image and the target image, the perspective item $q_k$ is used as keypoint perspective information corresponding to the source image and the target image, and the keypoint position information, the keypoint deformation information and the keypoint perspective information are used as keypoint feature information. The appearance feature of the source image is coded by the server by using a coding network of an appearance feature network (G), and appearance feature information corresponding to the source image is acquired.

203. The keypoint perspective information and the keypoint deformation information are fused by the server to acquire a perspective transformation parameter.

For example, $$q_k^S$$

corresponding to the source image (S) and $$q_k^D$$

corresponding to the target image (D) are screened out from $q_k$ by the server, the $$q_k^S$$

is used as first perspective information, and the $$q_k^D$$

is used as second perspective information.

$$J_k^S$$

corresponding to the source image (S) and $$J_k^D$$

corresponding to the target image (D) are screened out from $J_k$, the $$J_k^S$$

is used as the first deformation information, and the $$J_k^D$$

is used as the second deformation information. The $$J_k^S$$

and the $$J_k^D$$

are expanded. A specific expansion formula is as shown by Formula (1) below.

$$\tilde{J}_k^S \text{ and } \tilde{J}_k^D$$

are respectively used as the first initial perspective transformation parameter of the source image (S) and the second initial perspective transformation parameter of the target image (D). The $$\tilde{J}_k^S \text{ and the } \tilde{J}_k^D$$

are fused, and the fused $$(\tilde{J}_k^S)(\tilde{J}_k^D)^{-1}$$

is used as the perspective transformation parameter.

204. Perspective transformation is performed on the keypoint by the server according to the perspective transformation parameter and the keypoint position information to acquire optic flow information of the keypoint.

For example, the unit optic flow information of the keypoint is acquired, first position information $$p_k^S$$

of the keypoint in the source image (S) and second position information $$p_k^D$$

of the keypoint in the target image (D) are screened out from the $p_k$. Perspective transformation is performed on the keypoint according to the unit optic flow information, the second position information and the perspective transformation parameter to acquire initial optic flow information of the keypoint. The first position information and the initial optic flow information are fused to acquire the optic flow information of the keypoint. The procedure may be specifically as shown by Formula (2). Reference to Formula (3) and Formula (4) may be taken for specific procedures of the perspective transformation operation on the keypoint.

205. Warping operation is performed by the server on the source image according to the optic flow information to acquire at least one warped source image.

For example, the warping operation is performed on each source image by the server based on a backward optic flow $$\mathcal{J}_{S \leftarrow D}^k$$

of a sparse motion field corresponding to each pair of keypoints, to acquire K warped images $S^k$, and the warped images are used as warped source images.

206. The unit optic flow information, the first position information, the second position information and the warped source image are fused by the server to acquire a fused source image.

For example, a first position difference value of the first position information and the unit optic flow information is calculated by the server, and a second position difference value of the second position information and the unit optic flow information is calculated. A differential heat map for indicating the transformation transmitting position is calculated by using Formula (5) according to the first position difference value and the second position difference value, and the differential heat map is used as the transformation position information of the keypoint. Depth information of the differential heat map and the warped source image is acquired, and the differential heat map and the warped source image are stitched based on the depth information to acquire the fused source image information.

207. Motion information corresponding to the keypoint is recognized by the server from the fused source image information.

For example, multi-dimensional feature extraction is performed on the fused source image information by the server by using a dense motion network (DM) to acquire the local motion feature information of the keypoint, the occlusion information of the source image and the attention weight. The local motion feature information may be weighted in a space weighting manner to acquire weighted motion feature information. The weighted motion feature information is fused by using a calculation method according to Formula (6) to acquire attitude information of the object in the target image. The attitude information, the occlusion information and the attention weight are used as the motion information of the keypoint.

208. The motion information and the appearance feature information are fused by the server to acquire a processed image.

For example, by taking the appearance feature information being $\xi \in R^{C \times H' \times W'}$ as an example, according to the attitude information, backward warping operation is performed by the server on the appearance feature information, and then, the information after the backward warping operation is fused with the occlusion information to acquire the initial image information. A specific calculation formula may be as shown by Formula (11). Through softmax by using Formula (12), normalization processing is performed on the attention weight to acquire a weighted parameter of each pixel position in the source image. Based on the weighted parameter, image information corresponding to each pixel position in the initial image information is weighted to acquire the weighted image information. The weighted image information is fused to acquire the target image information. Reference to Formula (13) may be taken for a specific fusing process. The target image information is decoded by the server by using a decoder of an appearance feature network (G) to acquire the processed image.

From the above, according to embodiments of this application, after the target image for motion transfer and at least one source image corresponding to the target image are acquired by the server, multi-dimensional feature extraction is performed on the source image and the target image to acquire the keypoint feature information of the keypoint in the source image and the target image, and appearance feature information corresponding to the source image, and the keypoint feature information includes keypoint perspective information. Then, perspective transformation is performed on the keypoint according to the keypoint perspective information to acquire the optic flow information of the keypoint, and the optic flow information is used for indicating transformation information of the keypoint from the source image to the target image. Then, motion information corresponding to the keypoint is determined based on the optic flow information and the keypoint feature information, the motion information and the appearance feature information are fused to acquire a processed image, and the processed image is an image acquired after transferring motion of an object in the target image to an object in the source image. Since the motion is represented by performing perspective transformation on the keypoint of the target image and the source image according to this solution, a local motion detail can be accurately caught, complicated motion change can be treated, and problems such as great attitude change and serious background occlusion can be solved. Therefore, the image processing accuracy can be greatly improved.

To better implement the foregoing method, an embodiment of this application further provides an image processing apparatus. The image processing apparatus may be integrated in an electronic device, for example, a device such as a server or a terminal. The terminal may include a tablet computer, a notebook computer and/or a PC.

Figure 6:
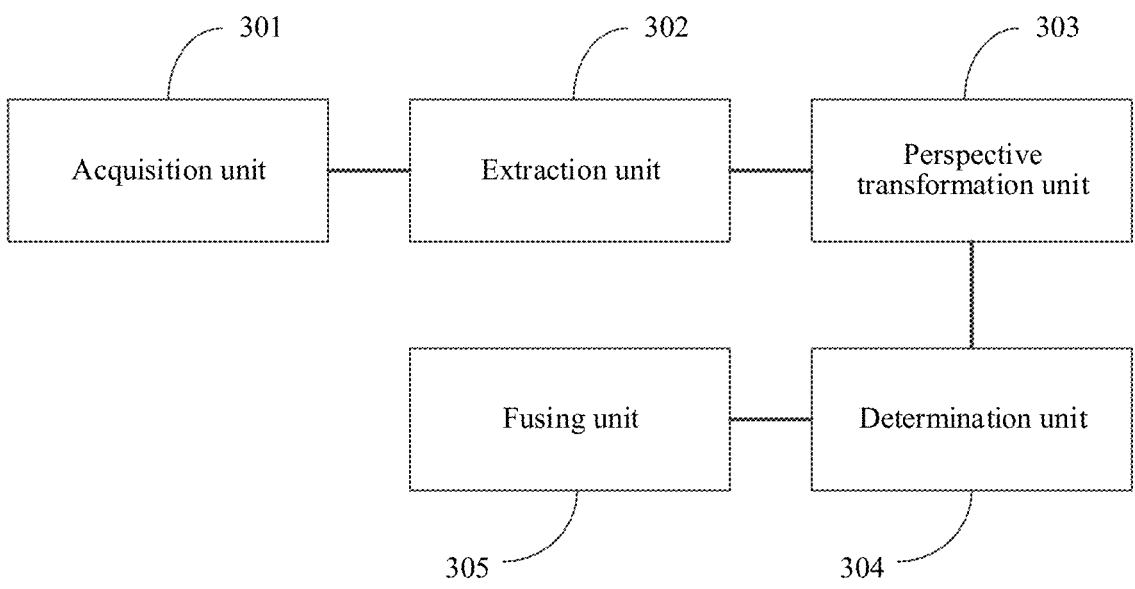
FIG. 6 is a schematic structural diagram of an image processing apparatus according to an embodiment of this application.

For example, as shown in FIG. 6, the image processing apparatus may include an acquisition unit 301, an extraction unit 302, a perspective transformation unit 303, a determination unit 304 and a fusing unit 305 as follows:

(1) Acquisition Unit 301

The acquisition unit 301 is configured to acquire a target image for motion transfer and at least one source image corresponding to the target image.

For example, the acquisition unit 301 may be specifically configured to screen out the target image for motion transfer and at least one source image corresponding to the target image from the same video, or screen out the target image for motion transfer and at least one source image corresponding to the target image from different videos, or directly receive or acquire the image including the object motion uploaded by the user to be used as the target image, and use one or a plurality of uploaded other images as the source image corresponding to the target image, and may also crawl an image including the object motion from Internet to be used as the target image and then crawl at least one another image as the source image corresponding to the target image.

(2) Extraction Unit 302

The extraction unit 302 is configured to perform multi-dimensional feature extraction on the source image and the target image to acquire keypoint feature information of a corresponding keypoint or keypoints in the source image and the target image, and appearance feature information corresponding to the source image. The keypoint feature information includes keypoint perspective information.

For example, the extraction unit 302 may be specifically configured to perform feature extraction on the keypoint in the source image and the target image by using the keypoint detection network of the trained processing model to acquire the keypoint feature information of the keypoint in the source image and the keypoint feature information of the keypoint in the target image, and perform feature extraction on the appearance feature of the source image by using the appearance feature network of the trained processing model to acquire appearance feature information corresponding to the source image.

(3) Perspective Transformation Unit 303

The perspective transformation unit 303 is configured to perform perspective transformation on the keypoint according to the keypoint perspective information to acquire optic flow information of the keypoint, and the optic flow information is used for indicating transformation information of the keypoint from the source image to the target image.

For example, the perspective transformation unit 303 may be specifically configured to fuse the keypoint perspective information and the keypoint deformation information to acquire a perspective transformation parameter, and perform perspective transformation on the keypoint according to the perspective transformation parameter and the keypoint position information to acquire optic flow information of the keypoint.

(4) Determination Unit 304

The determination unit 304 is configured to determine motion information corresponding to the keypoint based on the optic flow information and the keypoint feature information.

For example, the determination unit 304 may be specifically configured to perform the warping operation on the source image according to the optic flow information to acquire at least one warped source image, fuse the unit optic flow information, the first position information, the second position information and the warped source image to acquire a fused source image, and recognize the motion information corresponding to the keypoint from the fused source image.

(5) Fusing Unit 305

The fusing unit 305 is configured to fuse the motion information and the appearance feature information to acquire a processed image, and the processed image is an image acquired after transferring motion of an object in the target image to an object in the source image.

For example, the fusing unit 305 may be specifically configured to fuse the attitude information, the occlusion information and the appearance feature information to acquire the initial image information, weight the initial image information based on the attention weight to acquire the target image information, and generate the processed image according to the target image information.

Figure 7:
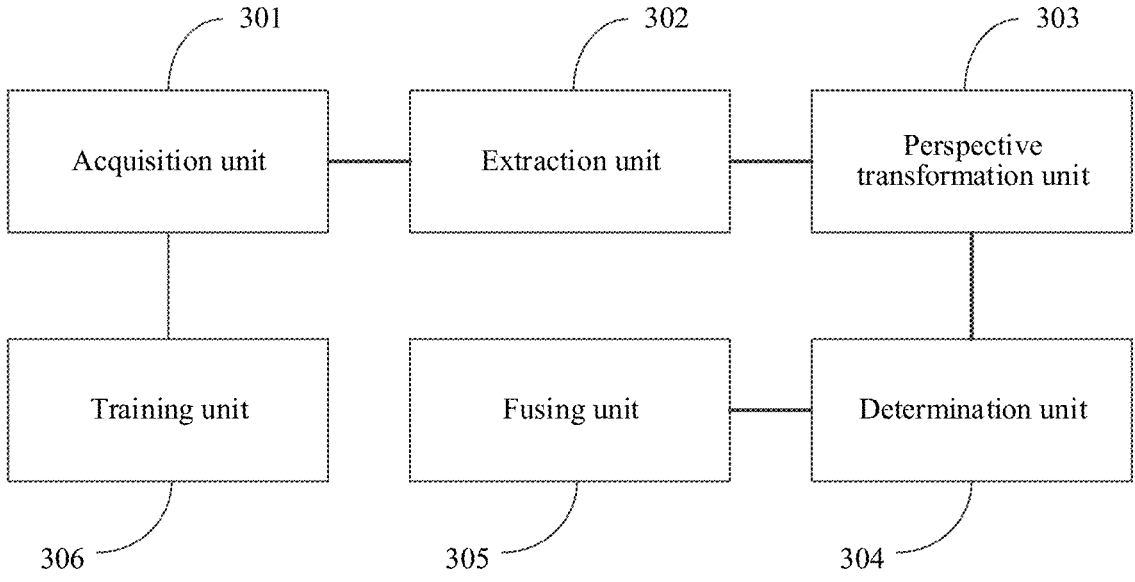
FIG. 7 is another schematic structural diagram of an image processing apparatus according to an embodiment of this application.

The image processing apparatus may further include a training unit 306, and may be specifically as follows as shown in FIG. 7.

The training unit 306 is configured to train the preset processing model to acquire the trained processing model.

For example, the training unit 306 may be specifically configured to acquire a source image sample and a target image sample, perform motion transfer on an object in the source image sample and the target image sample by using a preset processing model to acquire a target motion image, and converge the preset processing model according to the target motion image and the target image sample to acquire the trained processing model.

During specific implementations, the foregoing units may be implemented as independent entities, or may be randomly combined, or may be implemented as the same entity or several entities. For specific implementations of the foregoing units, refer to the foregoing method embodiments. Details are not described herein again.

From the above, according to embodiments of this application, after the target image for motion transfer and at least one source image corresponding to the target image are acquired by the acquisition unit 301, multi-dimensional feature extraction is performed on the source image and the target image by the extraction unit 302 to acquire the keypoint feature information of the keypoint in the source image and the target image, and appearance feature information corresponding to the source image, and the keypoint feature information includes keypoint perspective information. Then, perspective transformation is performed on the keypoint by the perspective transformation unit 303 according to the keypoint perspective information to acquire the optic flow information of the keypoint, and the optic flow information is used for indicating transformation information of the keypoint from the source image to the target image. Then, motion information corresponding to the keypoint is determined by the determination unit 304 based on the optic flow information and the keypoint feature information, the motion information and the appearance feature information are fused by the fusing unit 305 to acquire a processed image, and the processed image is an image acquired after transferring motion of an object in the target image to an object in the source image. Since the motion is represented by performing perspective transformation on the keypoint of the target image and the source image according to this solution, a local motion detail can be accurately caught, complicated motion change can be treated, and problems such as great attitude change and serious background occlusion can be solved. Therefore, the image processing accuracy can be greatly improved.

Figure 8:
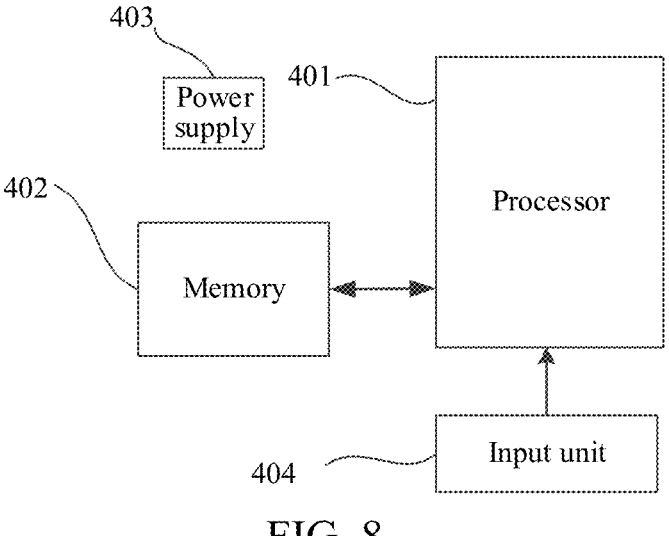
FIG. 8 is a schematic structural diagram of an electronic device according to an embodiment of this application.

According to an embodiment of this application, an electronic device is further provided. FIG. 8 is a schematic structural diagram of an electronic device according to an embodiment of this application.

the electronic device may include components such as a processor 401 with one or more processing cores, a memory 402 with one or more computer readable storage media, a power supply 403, and an input unit 404. A person skilled in the art may understand that the electronic device structure shown in FIG. 8 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. The processor 401 may include one or more processing cores. The processor 401 may integrate an application processor and a modem. The application processor mainly processes an operating system, a user interface, an application program, and the like. The modem mainly processes wireless communication. It may be understood that the foregoing modem may either not be integrated into the processor 401.

The memory 402 may be configured to store the software programs and modules. The processor 401 runs the software programs and modules stored in the memory 402, to perform various function application and data processing. The memory 402 may mainly include a program storage area and a data storage area. The program storage area may store an operating system, an application program required by at least one function (for example, a sound playback function and an image display function), and the like. The data storage area may store data created according to use of the electronic device. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. The power supply 403 may logically connect to the processor 401 by using a power supply management system, thereby implementing functions, such as charging, discharging, and power consumption management, by using the power supply management system. The power supply 403 may further include one or more of a direct current or alternating current power supply, a re-charging system, a power failure detection circuit, a power supply converter or inverter, a power supply state indicator, and any other components.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 in the electronic device may load executable files corresponding to processes of one or more application programs to the memory 402 according to the following instructions, and the processor 401 runs the application program stored in the memory 402, to implement various functions as follows:

A target image for motion transfer and at least one source image corresponding to the target image are acquired, multi-dimensional feature extraction is performed on the source image and the target image to acquire keypoint feature information of the keypoint in the source image and the target image, and appearance feature information corresponding to the source image, and the keypoint feature information includes keypoint perspective information. Perspective transformation is performed on the keypoint according to the keypoint perspective information to acquire optic flow information of the keypoint, and the optic flow information is used for indicating transformation information of the keypoint from the source image to the target image. Motion information corresponding to the keypoint is determined based on the optic flow information and the keypoint feature information, the motion information and the appearance feature information are fused to acquire a processed image, and the processed image is an image acquired after transferring motion of an object in the target image to an object in the source image.

For example, the target image for motion transfer and at least one source image corresponding to the target image are screened out from the same video, or the target image for motion transfer and at least one source image corresponding to the target image are screened out from different videos, or the image including the object motion uploaded by the user is directly received or acquired to be used as the target image, and one or a plurality of uploaded other images are used as the source image corresponding to the target image. An image including the object motion may also be crawled from Internet to be used as the target image, and then, at least one another image is crawled to be used as the source image corresponding to the target image. Feature extraction is performed on the keypoint in the source image and the target image by using the keypoint detection network of the trained processing model to acquire keypoint feature information of the keypoint in the source image and the keypoint feature information of the keypoint in the target image. Feature extraction is performed on the appearance feature of the source image by using the appearance feature network of the trained processing model to acquire the appearance feature information corresponding to the source image. The keypoint perspective information and the keypoint deformation information are fused to acquire a perspective transformation parameter, and perspective transformation is performed on the keypoint according to the perspective transformation parameter and the keypoint position information to acquire optic flow information of the keypoint. Warping operation is performed on the source image according to the optic flow information to acquire at least one warped source image.

The unit optic flow information, the first position information, the second position information and the warped source image are fused to acquire a fused source image, and the motion information corresponding to the keypoint is recognized from the fused source image. The attitude information, the occlusion information and the appearance feature information are fused to acquire the initial image information, the initial image information is weighted based on the attention weight to acquire the target image information, and the processed image is generated according to the target image information.

For a specific implementation of each of the foregoing operations, reference may be made to the foregoing embodiments. Details are not described herein again.

From the above, according to embodiments of this application, after the target image for motion transfer and at least one source image corresponding to the target image are acquired, multi-dimensional feature extraction is performed on the source image and the target image to acquire the keypoint feature information of the keypoint in the source image and the target image, and appearance feature information corresponding to the source image, and the keypoint feature information includes keypoint perspective information. Then, perspective transformation is performed on the keypoint according to the keypoint perspective information to acquire the optic flow information of the keypoint, and the optic flow information is used for indicating transformation information of the keypoint from the source image to the target image. Then, motion information corresponding to the keypoint is determined based on the optic flow information and the keypoint feature information, the motion information and the appearance feature information are fused to acquire a processed image, and the processed image is an image acquired after transferring motion of an object in the target image to an object in the source image. Since the motion is represented by performing perspective transformation on the keypoint of the target image and the source image according to this solution, a local motion detail can be accurately caught, complicated motion change can be treated, and problems such as great attitude change and serious background occlusion can be solved. Therefore, the image processing accuracy can be greatly improved.

A person of ordinary skill in the art may understand that all or some of the steps in the methods in the foregoing embodiments may be implemented by using instructions, or implemented by instructions controlling relevant hardware. The instructions may be stored in a computer readable storage medium and loaded and executed by a processor.

Accordingly, an embodiment of this application provides a computer readable storage medium, storing a plurality of instructions. The instructions can be loaded by the processor, to perform the steps in any image processing method provided in the embodiments of this application. For example, the instructions may perform the following steps:

A target image for motion transfer and at least one source image corresponding to the target image are acquired, multi-dimensional feature extraction is performed on the source image and the target image to acquire keypoint feature information of the keypoint in the source image and the target image, and appearance feature information corresponding to the source image, and the keypoint feature information includes keypoint perspective information. Perspective transformation is performed on the keypoint according to the keypoint perspective information to acquire optic flow information of the keypoint, and the optic flow information is used for indicating transformation information of the keypoint from the source image to the target image. Motion information corresponding to the keypoint is determined based on the optic flow information and the keypoint feature information, the motion information and the appearance feature information are fused to acquire a processed image, and the processed image is an image acquired after transferring motion of an object in the target image to an object in the source image.

For example, the target image for motion transfer and at least one source image corresponding to the target image are screened out from the same video, or the target image for motion transfer and at least one source image corresponding to the target image are screened out from different videos, or the image including the object motion uploaded by the user is directly received or acquired to be used as the target image, and one or a plurality of uploaded other images are used as the source image corresponding to the target image. An image including the object motion may also be crawled from Internet to be used as the target image, and then, at least one another image is crawled to be used as the source image corresponding to the target image. Feature extraction is performed on the keypoint in the source image and the target image by using the keypoint detection network of the trained processing model to acquire keypoint feature information of the keypoint in the source image and the keypoint feature information of the keypoint in the target image. Feature extraction is performed on the appearance feature of the source image by using the appearance feature network of the trained processing model to acquire the appearance feature information corresponding to the source image. The keypoint perspective information and the keypoint deformation information are fused to acquire a perspective transformation parameter, and perspective transformation is performed on the keypoint according to the perspective transformation parameter and the keypoint position information to acquire optic flow information of the keypoint. Warping operation is performed on the source image according to the optic flow information to acquire at least one warped source image. The unit optic flow information, the first position information, the second position information and the warped source image are fused to acquire a fused source image, and the motion information corresponding to the keypoint is recognized from the fused source image. The attitude information, the occlusion information and the appearance feature information are fused to acquire the initial image information, the initial image information is weighted based on the attention weight to acquire the target image information, and the processed image is generated according to the target image information.

For the specific implementations of the foregoing operations, reference may be made to the foregoing embodiments, and details are not described herein again.

The computer readable storage medium may include: a read-only memory (ROM), a random access memory (RAM), a magnetic disk, an optical disc or the like.

Because instructions stored in the computer readable storage medium may perform the steps of any image processing method provided in the embodiments of this application, the instructions can implement beneficial effects that may be implemented by any image processing method in the embodiments of this application. For details, refer to the foregoing embodiments. Details are not described herein again.

An aspect of the embodiments of this application provides a computer program product or a computer program, the computer program product or the computer program including computer instructions, the computer instructions being stored in a computer readable storage medium. A processor of a computer device reads the computer instructions from the computer readable storage medium, and executes the computer instructions, so that the computer device performs the method provided in the various implementations in the foregoing various aspects.

The image processing method and apparatus, and the computer readable storage medium provided in the embodiments of this application are described in detail above. The principles and implementations of this application are described through specific examples in this specification, and the descriptions of the embodiments are only intended to help understand the methods and core ideas of this application. Meanwhile, a person of ordinary skill in the art may make modifications to the specific implementations and application scopes according to the ideas of this application. In conclusion, the content of the specification should not be construed as a limitation to this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image processing method performed by an electronic device, the image processing method comprising:

acquiring a target image comprising a first object for motion transfer and a plurality of source images corresponding to the target image, wherein each of the plurality of source images includes a same object, which is a second object different from the first object in the target image;

for each source image of the plurality of source images:

performing multi-dimensional feature extraction on the source image and the target image to acquire keypoint feature information of corresponding keypoints in the source image and the target image, and appearance feature information corresponding to the source image, the keypoint feature information comprising keypoint perspective information;

performing perspective transformation on the keypoints according to the keypoint perspective information to acquire optic flow information of the keypoints, the optic flow information indicating transformation information of the keypoints from the source image to the target image;

determining motion information corresponding to the keypoints based on the optic flow information and the keypoint feature information, wherein the motion information includes attitude information and occlusion information of the source image;

fusing the attitude information, the occlusion information and the appearance feature information to acquire initial image information corresponding to the source image; and fusing the initial image information corresponding to the plurality of source images to acquire a processed image based on a weighted combination using attention weights associated with the plurality of source images respectively, the processed image being an image acquired after transferring motion of the first object in the target image to the second object in the plurality of source images.

2. The image processing method according to claim 1, wherein the keypoint feature information further comprises keypoint position information and keypoint deformation information, and the performing perspective transformation on the keypoints according to the keypoint perspective information to acquire optic flow information of the keypoints comprises:

fusing the keypoint perspective information and the keypoint deformation information to acquire a perspective transformation parameter; and performing perspective transformation on the keypoints according to the perspective transformation parameter and the keypoint position information to acquire the optic flow information of the keypoints.

3. The image processing method according to claim 2, wherein the fusing the keypoint perspective information and the keypoint deformation information to acquire a perspective transformation parameter comprises:

respectively constructing a first initial perspective transformation parameter of the source image and a second initial perspective transformation parameter of the target image based on the keypoint perspective information and the keypoint deformation information; and fusing the first initial perspective transformation parameter and the second initial perspective transformation parameter to acquire the perspective transformation parameter.

4. The image processing method according to claim 2, wherein the performing perspective transformation on the keypoints according to the perspective transformation parameter and the keypoint position information to acquire the optic flow information of the keypoint comprises:

acquiring unit optic flow information of the keypoints, the unit optic flow information being optic flow information corresponding to a warping operation between the source image and the target image;

respectively screening out first position information of the keypoints in the source image and second position information of the corresponding keypoints in the target image from the keypoint position information;

performing the perspective transformation on the keypoints according to the unit optic flow information, the second position information and the perspective transformation parameter to acquire initial optic flow information of the keypoints; and fusing the first position information and the initial optic flow information to acquire the optic flow information of the keypoints.

5. The image processing method according to claim 4, wherein the determining motion information corresponding to the keypoints based on the optic flow information and the keypoint feature information comprises:

performing the warping operation on the source image according to the optic flow information to acquire at least one warped source image;

fusing the unit optic flow information, the first position information, the second position information and the warped source image to acquire fused source image information; and recognizing the motion information corresponding to the keypoints from the fused source image information.

6. The image processing method according to claim 5, wherein the fusing the unit optic flow information, the first position information, the second position information and the warped source image to acquire fused source image information comprises:

determining a first position difference value of the first position information and the unit optic flow information;

determining a second position difference value of the second position information and the unit optic flow information;

determining transformation position information of the keypoints according to the first position difference value and the second position difference value; and stitching the transformation position information and the warped source image to acquire the fused source image information.

7. The image processing method according to claim 5, further comprising:

acquiring a source image sample and a target image sample;

performing a motion transfer from an object in the target image sample to an object in in the source image sample using a preset processing model to acquire a target motion image, converging the preset processing model according to the target motion image and the target image sample to acquire a trained processing model based on a target loss function generated using:

a feature loss function generated based on input value differences between the target motion image and the target image sample at a plurality of zooming levels of an original resolution, a keypoint position loss function generated by performing space transformation on the target image sample to acquire a space transformed image and performing keypoint feature extraction on the target image sample and the space transformed image, and a keypoint deformation loss function generated based on a first keypoint deformation information obtained from the keypoint feature extraction performed on the target image sample and a second keypoint deformation information obtained from the keypoint feature extraction performed on the space transformed image;

wherein the recognizing motion information corresponding to the keypoints from the fused source image information comprises:

performing multi-dimensional feature extraction on the fused source image information by using the trained processing model to acquire local motion feature information of the keypoints, the occlusion information of the source image and an attention weight;

weighting the local motion feature information to acquire weighted motion feature information of the keypoints; and fusing the weighted motion feature information to acquire the attitude information of the first object in the target image, and using the attitude information, the occlusion information and the attention weight as the motion information corresponding to the keypoints.

8. An electronic device, comprising a processor and a memory, the memory storing an application program, the processor being configured to run the application program in the memory to perform an image processing method including:

acquiring a target image comprising a first object for motion transfer and a plurality of source images corresponding to the target image, wherein each of the plurality of source images includes a same object, which is a second object different from the first object in the target image;

for each source image of the plurality of source images:

performing multi-dimensional feature extraction on the source image and the target image to acquire keypoint feature information of corresponding keypoints in the source image and the target image, and appearance feature information corresponding to the source image, the keypoint feature information comprising keypoint perspective information;

performing perspective transformation on the keypoints according to the keypoint perspective information to acquire optic flow information of the keypoints, the optic flow information indicating transformation information of the keypoints from the source image to the target image;

determining motion information corresponding to the keypoints based on the optic flow information and the keypoint feature information, wherein the motion information includes attitude information and occlusion information of the source image;

fusing the attitude information, the occlusion information and the appearance feature information to acquire initial image information corresponding to the source image; and fusing the initial image information corresponding to the plurality of source images to acquire a processed image based on a weighted combination using attention weights associated with the plurality of source images respectively, the processed image being an image acquired after transferring motion of the first object in the target image to the second object in the plurality of source images.

9. The electronic device according to claim 8, wherein the keypoint feature information further comprises keypoint position information and keypoint deformation information, and the performing perspective transformation on the keypoints according to the keypoint perspective information to acquire optic flow information of the keypoints comprises:

fusing the keypoint perspective information and the keypoint deformation information to acquire a perspective transformation parameter; and performing perspective transformation on the keypoints according to the perspective transformation parameter and the keypoint position information to acquire the optic flow information of the keypoints.

10. The electronic device according to claim 9, wherein the fusing the keypoint perspective information and the keypoint deformation information to acquire a perspective transformation parameter comprises:

respectively constructing a first initial perspective transformation parameter of the source image and a second initial perspective transformation parameter of the target image based on the keypoint perspective information and the keypoint deformation information; and fusing the first initial perspective transformation parameter and the second initial perspective transformation parameter to acquire the perspective transformation parameter.

11. The electronic device according to claim 9, wherein the performing perspective transformation on the keypoints according to the perspective transformation parameter and the keypoint position information to acquire the optic flow information of the keypoint comprises:

acquiring unit optic flow information of the keypoints, the unit optic flow information being optic flow information corresponding to a warping operation between the source image and the target image;

respectively screening out first position information of the keypoints in the source image and second position information of the corresponding keypoints in the target image from the keypoint position information;

performing the perspective transformation on the keypoints according to the unit optic flow information, the second position information and the perspective transformation parameter to acquire initial optic flow information of the keypoints; and fusing the first position information and the initial optic flow information to acquire the optic flow information of the keypoints.

12. The electronic device according to claim 11, wherein the determining motion information corresponding to the keypoints based on the optic flow information and the keypoint feature information comprises:

performing the warping operation on the source image according to the optic flow information to acquire at least one warped source image;

fusing the unit optic flow information, the first position information, the second position information and the warped source image to acquire fused source image information; and recognizing the motion information corresponding to the keypoints from the fused source image information.

13. The electronic device according to claim 12, wherein the fusing the unit optic flow information, the first position information, the second position information and the warped source image to acquire fused source image information comprises:

determining a first position difference value of the first position information and the unit optic flow information;

determining a second position difference value of the second position information and the unit optic flow information;

determining transformation position information of the keypoints according to the first position difference value and the second position difference value; and stitching the transformation position information and the warped source image to acquire the fused source image information.

14. The electronic device according to claim 12, wherein the recognizing motion information corresponding to the keypoints from the fused source image information comprises:

performing multi-dimensional feature extraction on the fused source image information by using a trained processing model to acquire local motion feature information of the keypoints, the occlusion information of the source image and an attention weight;

weighting the local motion feature information to acquire weighted motion feature information of the keypoints; and fusing the weighted motion feature information to acquire the attitude information of the first object in the target image, and using the attitude information, the occlusion information and the attention weight as the motion information corresponding to the keypoints.

15. A non-transitory computer readable storage medium, storing a plurality of instructions, the instructions being suitable for being loaded by a processor of an electronic device, causing the electronic device to perform an image processing method including:

acquiring a target image comprising a first object for motion transfer and a plurality of source images corresponding to the target image, wherein each of the plurality of source images includes a same object, which is a second object different from the first object in the target image;

for each source image of the plurality of source images:

performing multi-dimensional feature extraction on the source image and the target image to acquire keypoint feature information of corresponding keypoints in the source image and the target image, and appearance feature information corresponding to the source image, the keypoint feature information comprising keypoint perspective information;

performing perspective transformation on the keypoints according to the keypoint perspective information to acquire optic flow information of the keypoints, the optic flow information indicating transformation information of the keypoints from the source image to the target image;

determining motion information corresponding to the keypoints based on the optic flow information and the keypoint feature information, wherein the motion information includes attitude information and occlusion information of the source image;

fusing the attitude information, the occlusion information and the appearance feature information to acquire initial image information corresponding to the source image; and fusing the initial image information corresponding to the plurality of source images to acquire a processed image based on a weighted combination using attention weights associated with the plurality of source images respectively, the processed image being an image acquired after transferring motion of the first object in the target image to the second object in the plurality of source images.

16. The non-transitory computer readable storage medium according to claim 15, wherein the keypoint feature information further comprises keypoint position information and keypoint deformation information, and the performing perspective transformation on the keypoints according to the keypoint perspective information to acquire optic flow information of the keypoints comprises:

fusing the keypoint perspective information and the keypoint deformation information to acquire a perspective transformation parameter; and performing perspective transformation on the keypoints according to the perspective transformation parameter and the keypoint position information to acquire the optic flow information of the keypoints.

17. The non-transitory computer readable storage medium according to claim 16, wherein the fusing the keypoint perspective information and the keypoint deformation information to acquire a perspective transformation parameter comprises:

respectively constructing a first initial perspective transformation parameter of the source image and a second initial perspective transformation parameter of the target image based on the keypoint perspective information and the keypoint deformation information; and fusing the first initial perspective transformation parameter and the second initial perspective transformation parameter to acquire the perspective transformation parameter.

18. The non-transitory computer readable storage medium according to claim 16, wherein the performing perspective transformation on the keypoints according to the perspective transformation parameter and the keypoint position information to acquire the optic flow information of the keypoint comprises:

acquiring unit optic flow information of the keypoints, the unit optic flow information being optic flow information corresponding to a warping operation between the source image and the target image;

respectively screening out first position information of the keypoints in the source image and second position information of the corresponding keypoints in the target image from the keypoint position information;

performing the perspective transformation on the keypoints according to the unit optic flow information, the second position information and the perspective transformation parameter to acquire initial optic flow information of the keypoints; and fusing the first position information and the initial optic flow information to acquire the optic flow information of the keypoints.

19. The non-transitory computer readable storage medium according to claim 18, wherein the determining motion information corresponding to the keypoints based on the optic flow information and the keypoint feature information comprises:

performing the warping operation on the source image according to the optic flow information to acquire at least one warped source image;

fusing the unit optic flow information, the first position information, the second position information and the warped source image to acquire fused source image information; and recognizing the motion information corresponding to the keypoint from the fused source image information.

20. The non-transitory computer readable storage medium according to claim 19, wherein the fusing the unit optic flow information, the first position information, the second position information and the warped source image to acquire fused source image information comprises:

determining a first position difference value of the first position information and the unit optic flow information;

determining a second position difference value of the second position information and the unit optic flow information;

determining transformation position information of the keypoints according to the first position difference value and the second position difference value; and stitching the transformation position information and the warped source image to acquire the fused source image information.

* * * * *